United States Patent
Mauger et al.

(10) Patent No.: US 12,515,049 B2
(45) Date of Patent: Jan. 6, 2026

(54) MEDICAL IMPLANT FOR TREATMENT OF SLEEP-DISORDERED BREATHING

(71) Applicant: Cochlear Limited, Macquarie University (AU)

(72) Inventors: Stefan Jozef Mauger, East Melbourne (AU); John Michael Heasman, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 354 days.

(21) Appl. No.: 18/022,695

(22) PCT Filed: Sep. 7, 2021

(86) PCT No.: PCT/IB2021/058140
§ 371 (c)(1),
(2) Date: Feb. 22, 2023

(87) PCT Pub. No.: WO2022/069974
PCT Pub. Date: Apr. 7, 2022

(65) Prior Publication Data
US 2023/0310862 A1    Oct. 5, 2023

Related U.S. Application Data

(60) Provisional application No. 63/085,451, filed on Sep. 30, 2020.

(51) Int. Cl.
*A61N 1/36* (2006.01)
*A61B 5/389* (2021.01)
*A61N 1/05* (2006.01)

(52) U.S. Cl.
CPC .......... *A61N 1/36139* (2013.01); *A61B 5/389* (2021.01); *A61N 1/0548* (2013.01); *A61N 1/36003* (2013.01); *A61N 1/3611* (2013.01)

(58) Field of Classification Search
CPC ... A61B 5/389; A61N 1/36139; A61N 1/0548
(Continued)

(56) References Cited

U.S. PATENT DOCUMENTS 8,639,343 B2   1/2014   De Vos
8,812,113 B2   8/2014   Mashiach
(Continued)

FOREIGN PATENT DOCUMENTS

WO    WO 2017/087681    5/2017

OTHER PUBLICATIONS

International Search Report for PCT Application No. PCT/IB2021/058140 dated Dec. 10, 2021 in 4 pages.
(Continued)

*Primary Examiner* — Nadia A Mahmood
(74) *Attorney, Agent, or Firm* — Knobbe, Martens, Olson & Bear, LLP (57) ABSTRACT

A method includes applying a stimulation profile having a plurality of stimulation signals to at least one muscle of a recipient and/or to at least one neuron configured to control the at least one muscle. The method further includes monitoring muscle fatigue of the at least one muscle during said applying the stimulation profile. The method further includes automatically modifying the stimulation profile in response to said muscle fatigue.

20 Claims, 8 Drawing Sheets

(58) Field of Classification Search
USPC .......................................................... 607/42
See application file for complete search history.

(56) References Cited

U.S. PATENT DOCUMENTS

| | | |
|---|---|---|
| 8,892,205 B2 | 11/2014 | Miller, III et al. |
| 9,302,093 B2 | 4/2016 | Mashiach |
| 9,415,215 B2 | 8/2016 | Mashiach |
| 9,498,627 B2 | 11/2016 | Rosenberg et al. |
| 9,943,686 B2 | 4/2018 | Mashiach |
| 2007/0173893 A1 | 7/2007 | Pitts |
| 2013/0079843 A1 | 3/2013 | Mashiach |
| 2014/0039450 A1 | 2/2014 | Green et al. |
| 2014/0371817 A1 | 12/2014 | Mashiach et al. |
| 2017/0274210 A1 | 9/2017 | Papay |
| 2018/0200512 A1 | 7/2018 | Bolea et al. |
| 2018/0221660 A1 | 8/2018 | Suri et al. |
| 2020/0016401 A1 | 1/2020 | Papay et al. |
| 2020/0238084 A1 | 7/2020 | Ignagni |
| 2020/0281763 A1* | 9/2020 | Scheiner ................ A61B 5/296 |

OTHER PUBLICATIONS

Written Opinion for PCT Application No. PCT/IB2021/058140 dated Dec. 10, 2021 in 7 pages.
H. Jin et al., "Acoustic Analysis of Snoring in the Diagnosis of Obstructive Sleep Apnea Syndrome: A Call for More Rigorous Studies," J. Clinical Sleep Medicine, vol. 11, No. 7, p. 765 (2015).
E. Koutsos et al., "A Muscle Fibre Conduction Velocity Tracking ASIC for Local Fatigue Monitoring," IEEE Trans. Biomed. Circuits and Systems, vol. 10, No. 6, pp. 1119-1128 (2016).
D. McSharry et al., "Genioglossus fatigue in obstructive sleep apnea," Resp. Phys. & Neurobio., vol. 183, pp. 59-66 (2012).
M. Sasaki et al., "Tongue interface based on surface EMG signals of suprahyoid muscles," Robomech. J., vol. 3, No. 9, (2016).

* cited by examiner

MEDICAL IMPLANT FOR TREATMENT OF SLEEP-DISORDERED BREATHING

BACKGROUND

Field

The present application relates generally to systems and methods for treating sleep-disordered breathing (SDB) conditions, and more specifically, for preventing or minimizing SDB events using stimulation signals from a medical implant.

Description of the Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect disclosed herein, a method comprises applying a stimulation profile comprising a plurality of stimulation signals to at least one muscle of a recipient and/or to at least one neuron configured to control the at least one muscle. The method further comprises monitoring muscle fatigue of the at least one muscle during said applying the stimulation profile. The method further comprises automatically modifying the stimulation profile in response to said muscle fatigue.

In another aspect disclosed herein, an apparatus comprises first circuitry configured to be implanted on or within a recipient's body. The first circuitry is configured to apply stimulation signals to at least one muscle of a recipient and/or to at least one neuron configured to control the at least one muscle. The apparatus further comprises second circuitry configured to generate information indicative of muscle fatigue of the at least one muscle. The apparatus further comprises third circuitry configured to, in response at least in part to the information indicative of the muscle fatigue, provide control signals to the first circuitry. The control signals are indicative of a stimulation signal profile configured to reduce the muscle fatigue of the at least one muscle In another aspect disclosed herein, a non-transitory computer readable storage medium has stored thereon a computer program that instructs a computer system to automatically adjust stimulation signals configured to affect at least one muscle of a recipient. The computer program instructs the computer system to apply first stimulation signals to the at least one muscle and/or to at least one nerve configured to control the at least one muscle. The first stimulation signals have a first set of attributes. The computer program further instructs the computer system to detect fatigue of the at least one muscle in response to the first stimulation signals. The computer program further instructs the computer system, in response to said detected fatigue, to apply second stimulation signals to the at least one muscle and/or to the at least one nerve. The second stimulation signals having a second set of attributes different from the first set of attributes.

BRIEF DESCRIPTION OF THE DRAWINGS

Implementations are described herein in conjunction with the accompanying drawings, in which.

DETAILED DESCRIPTION

Certain implementations described herein provide an implantable medical device configured to apply stimulation signals to a recipient during a sleep session to treat sleep-disordered breathing (SDB) conditions, for example, reducing the number and/or severity of obstructive sleep apnea (OSA) events. For example, stimulation of the hypoglossal nerve can be used to move the tongue from blocking the recipient's airway (e.g., during inhalation), with the stimulation level selected to provide the desired opening of the airway while avoiding having the recipient experience pain. While the genioglossus muscle's "slow twitch" muscle fibers are generally less prone to muscle fatigue from repeated stimulation than are "fast twitch" muscle fibers, fatigue can occur during a sleep session (e.g., about 8 hours) and can result in a reduction of efficacy due to less responsiveness of the tongue muscle to the repeated stimulations, as well as pain or other ailments experienced by the recipient.

Certain implementations described herein provide a trainable system (e.g., using closed loop control) configured to titrate and/or alter the stimulation signals in response to signals (e.g., electromyography signals) indicative of muscle fatigue of the recipient's tongue. Without making repeated visits to a polysomnography laboratory, the stimulation level can also be changed (e.g., optimized) to account for variations of various conditions night to night (e.g., recipient's stress levels, alcohol consumption, tiredness, posture, sleep state, etc.), adjusted to time the stimulation to a desired point during the respiratory cycle, and/or to provide feedback to the recipient and/or clinician on the treatment of the disease state.

The teachings detailed herein are applicable, in at least some implementations, to any type of implantable medical device (e.g., implantable stimulation system) comprising a first portion implanted on or within the recipient's body and configured to provide stimulation signals to a portion of the recipient's body and a second portion (e.g., implanted on or within the recipient or external to the recipient's body) configured to provide control signals to the first portion. For example, the implantable medical device can comprise a neurostimulation system and/or a muscle stimulation system. Implementations can include any type of medical device that can utilize the teachings detailed herein and/or variations thereof.

Merely for ease of description, apparatus and methods disclosed herein are primarily described with reference to an illustrative medical device, namely an implantable stimulation system configured to treat sleep-disordered breathing (SDB) conditions, for example, obstructive sleep apnea (OSA) conditions. However, the teachings detailed herein and/or variations thereof may also be used with a variety of other medical devices that provide a wide range of therapeutic benefits to recipients, patients, or other users. In some implementations, the teachings detailed herein and/or variations thereof can be utilized in other types of implantable medical devices beyond those configured to treat sleep-related conditions. For example, apparatus and methods disclosed herein and/or variations thereof may also be used with one or more of the following: vestibular devices (e.g., vestibular implants); sensory prostheses; auditory devices (e.g., bionic ears); auditory prostheses (e.g., cochlear implants); visual devices (e.g., bionic eyes); visual prostheses (e.g., retinal implants); sensors; cardiac pacemakers; drug delivery systems; defibrillators; functional electrical stimulation devices; catheters; brain implants; seizure devices (e.g., devices for monitoring and/or treating epileptic events); electroporation; pain relief devices; swallowing treatment devices (e.g., devices for treating difficulties with the hyoglossus and/or thyrohyoid muscles); dysphagia treatment devices; devices for treating dry mouth (e.g., xerostomia or hyposalivation), devices for treating excessive or absence of muscle movement due to stroke, Parkinson's disease, or other brain disorders, devices for treating hypertension (e.g., by stimulating the carotid sinus barosensory system); etc.

Obstructive sleep apnea (OSA), an example of a sleep-disordered breathing (SDB) disorder, is a widespread problem affecting adults in which a person's breathing airways are obstructed during sleep due to loss of tonus of the musculature surrounding the upper airways which results in tissues, either partially or completely, blocking the airways. Such blockage can alter or even stop the person's breathing (e.g., for 20-40 seconds or longer), resulting in snoring, hypoxemia, and/or hypoxia. The discomfort resulting from the stoppage of breathing can partially or fully arouse the person from sleep, upon which the tonus of the surrounding musculature increases, thereby reducing the blockage of the airways by the tissues and allowing the person to resume breathing and to return to sleep. This cycle typically repeats itself throughout the night, sometimes without the person realizing it, and the resultant inadequate sleep can be severe (e.g., disease progression; day-to-day quality of life of the individual; cost to society), leading to poorer quality of life, memory dysfunction, and a higher prevalence of developing or quickening the progression of other diseases.

Figure 1A:
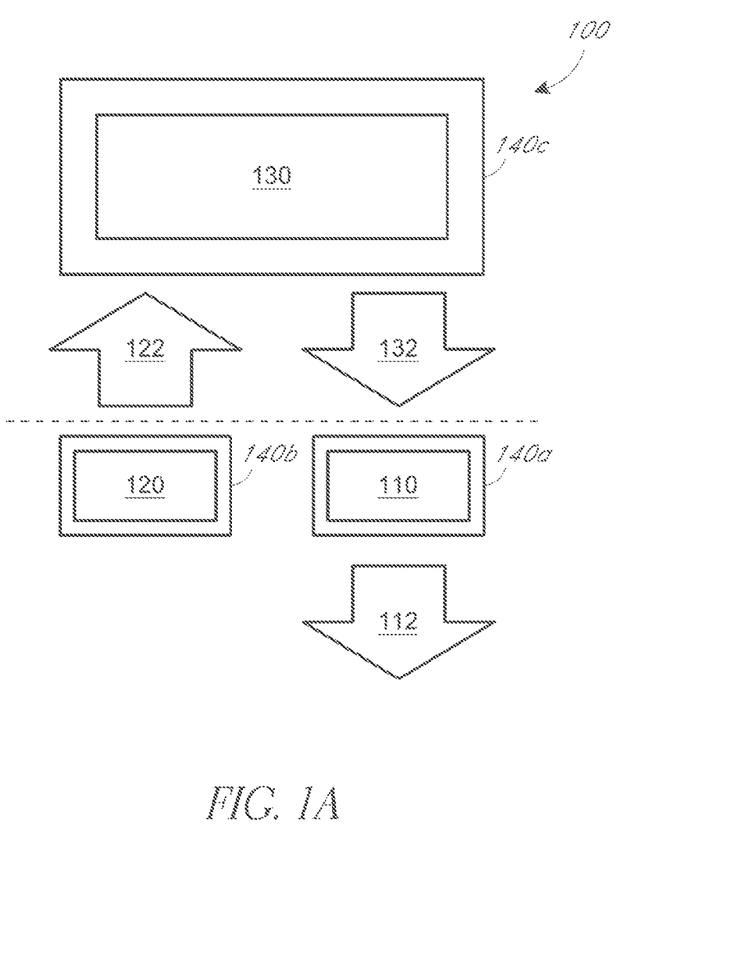
FIGS. 1A and 1B schematically illustrate an example apparatus in accordance with certain implementations described herein.
Figure 1B:
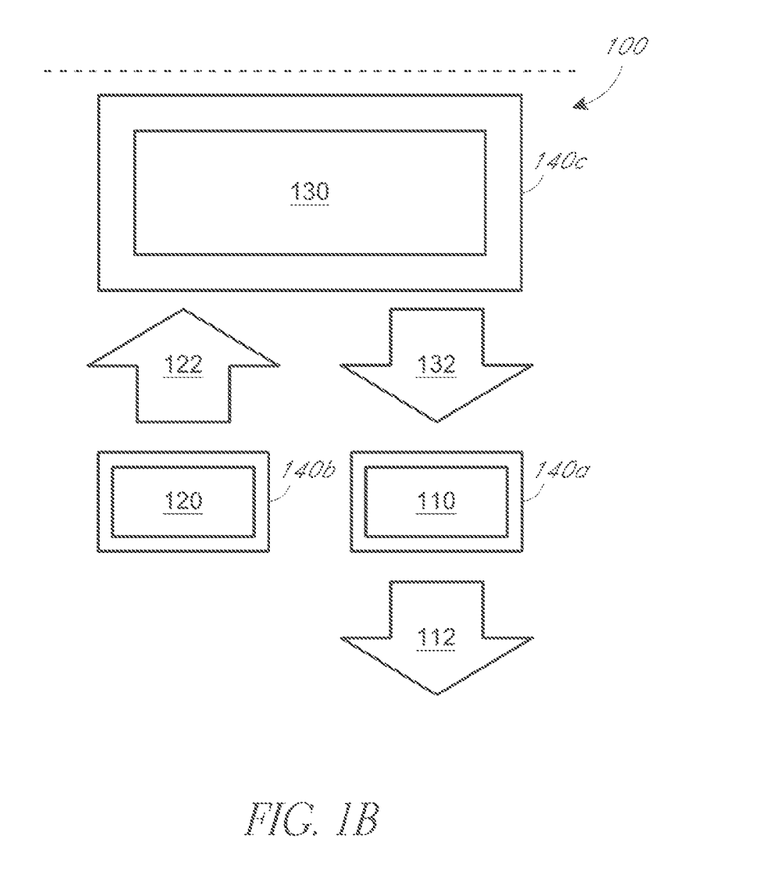

FIGS. 1A and 1B schematically illustrate an example apparatus 100 in accordance with certain implementations described herein. The apparatus 100 comprises first circuitry 110 (e.g., stimulation circuitry; stimulation device) configured to be positioned (e.g., implanted) on or within a recipient's body and configured to apply stimulation signals 112 to at least one muscle of a recipient and/or to at least one neuron configured to control the at least one muscle. The apparatus 100 further comprises second circuitry 120 (e.g., sensor circuitry) configured to be positioned (e.g., implanted on or within the recipient's body or external to the recipient's body) and configured to generate information (e.g., sensor signals 122) indicative of muscle fatigue of the at least one muscle. The apparatus 100 further comprises third circuitry 130 (e.g., control circuitry) configured to, in response at least in part to the information indicative of the muscle fatigue, provide control signals 132 to the first circuitry 110. The control signals 132 are indicative of a stimulation signal profile configured to reduce the muscle fatigue of the at least one muscle (e.g., to change the stimulation signal profile such that the muscle fatigue resulting from the changed stimulation signal profile is less than an amount of muscle fatigue resulting from an unchanged stimulation signal profile). In certain implementations, the first circuitry 110 is configured to apply the stimulation signals 112 during a sleep session of the recipient, the second circuitry 120 is configured to generate the information indicative of muscle fatigue during the sleep session, and the third circuitry is configured to provide the control signals 132 during the sleep session. While certain implementations are described herein as having the third circuitry 130 as a separate component from the first circuitry 110 and the second circuitry 120, in certain implementations, the third circuitry 130 can be integral with the first circuitry 110 and/or integral with the second circuitry 120.

In certain implementations, the apparatus 100 further comprises at least one housing 140 containing (e.g., hermetically sealing within) at least one of the first circuitry 110, the second circuitry 120 and the third circuitry 130. For example, as schematically illustrated in FIG. 1A, the at least one housing 140 comprises a first housing 140a containing at least a portion of the first circuitry 110, a second housing 140b containing at least a portion of the second circuitry 120, and a third housing 140c containing at least a portion of the third circuitry 130. The first and second housings 140a, 140b can be configured to be implanted on or within the recipient's body (e.g., subcutaneously, denoted in FIG. 1A as being below the dashed line), and can be integral with one another (e.g., portions of a common housing) or can be separate from one another. In certain other implementations, the first housing 140a is configured to be implanted on or within the recipient's body and the second housing 140b is configured to be positioned external to the recipient's body. In certain implementations, portions of the at least one housing 140 that are configured to be implanted on or within the recipient's body comprise at least one biocompatible material (e.g., polymer; PEEK; silicone; titanium; titanium alloy; ceramic).

In certain implementations, the at least one housing 140 comprises an implantable portion containing at least a portion of the third circuitry 130 and/or an external portion containing at least a portion of the third circuitry 130. For example, as schematically illustrated by FIG. 1A, the third housing 140c can be external to the recipient's body (denoted in FIG. 1A as being above the dashed line) (e.g., the third housing 140c positioned on an opposite side of the recipient's skin from the implantable first housing 140a and/or second housing 140b). In another example, as schematically illustrated by FIG. 1B, the third housing 140c can be configured to be implanted on or within the recipient's body (denoted in FIG. 1B as being below the dashed line), and can be separate from one or both of the first and second housings 140a, 140b or can be integral with one or both of the first and second housings 140a, 140b (e.g., portions of a common housing). For another example, an external portion of the third circuitry 130 can be within an external housing and an implantable portion of the third circuitry 130 can be within an implantable housing.

In certain implementations, the at least one housing 140 also contains a power source (not shown) of the apparatus 100, for example, a rechargeable battery and/or an antenna (e.g., wire coil comprising multiple turns of electrically insulated single-strand or multi-strand platinum or gold wire) of a transcutaneous energy transfer link configured to wirelessly receive power from a device external to the recipient's body. During operation of the apparatus 100, the power stored by the rechargeable battery can be distributed to the various other implanted components as needed. In certain implementations, the at least one housing 140 further comprises communication circuitry (not shown) configured to receive signals from and/or transmit signals to a device external to the recipient's body. For example, the communication circuitry can comprise at least one signal transceiver having at least one antenna (e.g., wire coil comprising multiple turns of electrically insulated single-strand or multi-strand platinum or gold wire) that is part of an inductive radio frequency (RF) communication link and is configured to receive control information wirelessly transmitted from the external device and/or to wirelessly transmit status information to the external device.

Figure 1C:
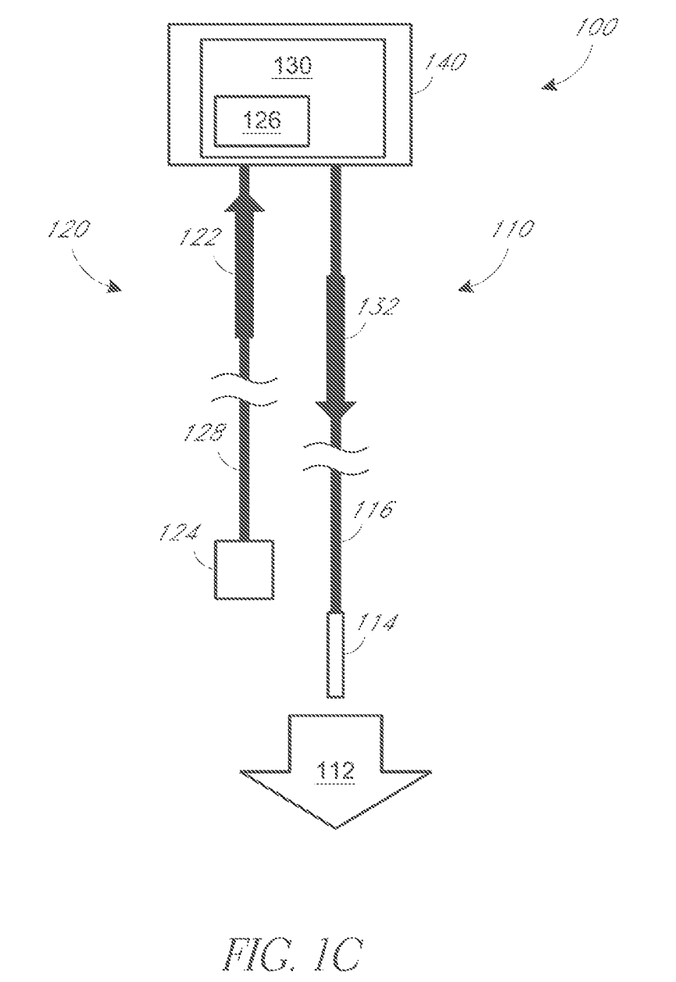
FIG. 1C schematically illustrates an example apparatus comprising electrical conduits configured to provide electrical communication among the first circuitry, the second circuitry, and the third circuitry in accordance with certain implementations described herein.
Figure 1D:
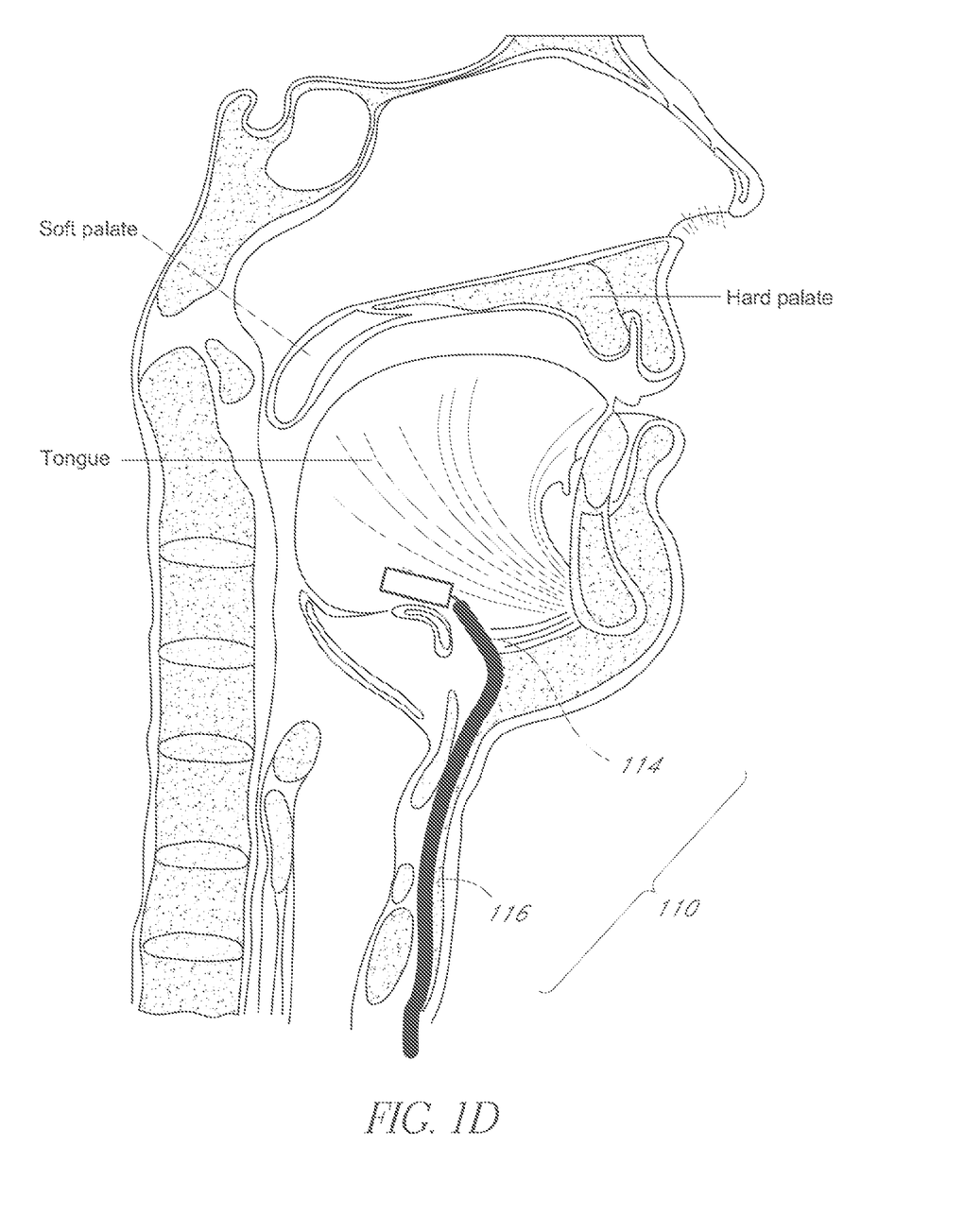
FIG. 1D schematically illustrates a sagittal plane view of a portion of a recipient's skull and tissue with a portion of the first circuitry in accordance with certain implementations described herein.

In certain implementations, as schematically illustrated by FIG. 1C, the first circuitry 110 comprises at least a portion of an implantable stimulation device and comprises at least one stimulation element 114 (e.g., electrical electrode; electrical contact; optical emitter; optical contact) configured to be positioned (e.g., implanted) on or within the recipient's body and to apply the stimulation signals 112 to at least one muscle of the tongue of the recipient and/or to a portion of a hypoglossal nerve of the recipient. For example, FIG. 1D schematically illustrates a sagittal plane view of a portion of a recipient's skull and tissue with a portion of the first circuitry 110 in accordance with certain implementations described herein. The first circuitry 110 of FIG. 1C comprises a muscle stimulation device (see, e.g., U.S. Pat. No. 8,892,205) in which the at least one stimulation element 114 is implanted within the recipient's tongue and is configured to apply the stimulation signals 112 (e.g., electrical stimulation signals; optical stimulation signals) to at least one muscle of the recipient's tongue. In certain other implementations, the first circuitry 110 comprises a neuromodulation device (e.g., a hypoglossal nerve stimulation device, see, e.g., U.S. Pat. Nos. 9,415,215 and 9,943,686) in which the at least one stimulation element 114 (e.g., an electrode cuff surrounding a portion of a hypoglossal nerve of the recipient) is configured to apply the stimulation signals 112 to a portion of the hypoglossal nerve.

In certain implementations, the first circuitry 110 has a proximal end connected to the third circuitry 130 (e.g., connected to an implantable portion of the at least one housing 140), and a distal end comprising the at least one stimulation element 114. For example, as schematically illustrated by FIG. 1C, the first circuitry 110 can comprise a signal conduit 116 (e.g., wire; cable) configured to transmit the control signals 132 from the third circuitry 130 to the at least one stimulation element 114. In certain other implementations, the signal conduit 116 is absent and the control signals 132 are wirelessly transmitted from the third circuitry 130 to the at least one stimulation element 114 (e.g., transmitted by radio frequency signals from an antenna of the third circuitry 130 to an antenna of the first circuitry 110). In certain implementations, at least a portion of the first circuitry 110 is hermetically sealed within a biocompatible housing 140a (e.g., a stimulator unit) separate from the housing 140c comprising the third circuitry 130.

In certain implementations, the first circuitry 110 comprises a plurality of stimulation elements 114 positioned relative to one another such that the plurality of stimulation elements 114 can be selectively activated to apply different stimulations signals 112 to the at least one muscle and/or to the at least one neuron. For example, the plurality of stimulation elements 114 can comprise more than two electrodes and the first circuitry 110 can be configured to apply selected voltage differences between selected pairs of the two or more electrodes (e.g., different stimulation vectors).

In certain implementations, the second circuitry 120 comprises at least a portion of an electromyogram (EMG) device comprising at least one EMG sensor 124 (e.g., electrode). In certain implementations, the at least one EMG sensor 124 is configured to be positioned externally to the recipient's body (e.g., on the recipient's chin), while in certain other implementations, the at least one EMG sensor 124 is configured to be implanted on or within the recipient's body (e.g., at a sublingual location). The at least one EMG sensor 124 is configured to generate sensor signals 122 indicative of muscle fatigue of the at least one muscle that is stimulated by the first circuitry 110 and/or is controlled by at least one neuron that is stimulated by the first circuitry 110 (e.g., the sensor signals 122 comprising information indicative of the muscle fatigue) and a processor circuit 126 configured to receive the sensor signals 122 from the at least one EMG sensor 124. The processor circuit 126 of certain implementations comprises one or more digital signal processors (DSPs), one or more microcontroller cores, one or more application-specific integrated circuits (ASICs), firmware, software, etc. configured to generate the sensor signals 122 in response to the information regarding the muscle fatigue received from the at least one EMG sensor 124 and to provide the sensor signals 122 to the third circuitry 130. For example, the processor circuit 126 can be configured to continuously stream the sensor signals 122 to the third circuitry 130 during the sleep session. While certain implementations are described herein utilizing EMG sensor signals, other implementations can utilize evoked compound action potential (ECAP) signals to monitor the response of the hypoglossal nerve to stimulation. Use of ECAP sensor signals can be nearly instantaneous (e.g., within one millisecond) as compared to EMG sensor signals (e.g., hundreds of milliseconds) and can be local to the stimulating electrodes (e.g., measured using the stimulation electrodes, thereby avoiding additional sensor electrodes).

In certain implementations, the second circuitry 120 has a proximal end connected to the third circuitry 130 (e.g., connected to an implantable portion of the at least one housing 140), and a distal end comprising the at least one EMG sensor 124. For example, as schematically illustrated by FIG. 1C, the second circuitry 120 can comprise a signal conduit 128 (e.g., wire; cable) configured to transmit the sensor signals 122 from the at least one EMG sensor 124 to the processor circuit 126, and the processor circuit 126 can be configured to generate the information indicative of the muscle fatigue in response to the sensor signals 122. In certain other implementations, the signal conduit 128 is absent and the sensor signals 122 are wirelessly transmitted from the at least one EMG sensor 124 to the processor circuit 126 (e.g., transmitted by radio frequency signals from an antenna of the at least one EMG sensor 124 to an antenna of the processor circuit 126).

In certain implementations, as schematically illustrated by FIG. 1C, the processor circuit 126 can be a component of the third circuitry 130, while in certain other implementations, the processor circuit 126 is separate from but in communication with the third circuitry 130. For example, the processor circuit 126 can be within the portion of the at least one housing 140 that contains the third circuitry 130, as schematically illustrated by FIG. 1C, or the processor circuit 126 and other components of the second circuitry 120 can be hermetically sealed within a biocompatible housing 140b (e.g., a sensor unit) separate from the housing 140c comprising the third circuitry 130.

In certain implementations, the third circuitry 130 comprises one or more digital signal processors (DSPs), one or more microcontroller cores, one or more application-specific integrated circuits (ASICs), firmware, software, etc. configured to receive the sensor signals 122 from the second circuitry 120 during the sleep session and in response at least in part to the sensor signals 122, to provide control signals 132 to the first circuitry 110 during the sleep session. For example, the third circuitry 130 can be configured to extract the information indicative of the muscle fatigue of the at least one muscle during the sleep session from the sensor signals 122, to evaluate the information in real-time, and to determine appropriate control signals 132 to be provided to the first circuitry 110 during the sleep session. The control signals 132 are indicative of a stimulation signal profile that comprises one or more stimulation attributes (e.g., stimulation parameters; stimulation type) of the stimulation signals 112 to be applied to the recipient's body during the sleep session.

In certain implementations, the one or more stimulation attributes of the stimulation signal profile comprises at least one of: a repetition rate of the stimulation signals 112 (e.g., number per unit time; frequency), a phase duration or burst duration of the stimulation signals 112 (e.g., a time period during which a sequence of stimulation signals 112 is applied), a temporal amplitude profile of the stimulation signals 112 (e.g., pulse amplitude as a function of time; temporal shapes of the individual stimulation signal pulses; long anodic phase shape; temporal shape of an envelope of stimulation signal pulses during a phase or burst of the stimulation signals 112; pulse width; interphase gap duration of the stimulation signal pulses); a temporal ramping rate of a stimulation signal amplitude (e.g., a slope of the leading edge of the stimulation signal pulses); an onset voltage; an offset voltage; an amplitude of the stimulation signals 112. In certain implementations in which the at least one stimulation element 114 comprises more than two electrodes, the stimulation signal profile can comprise a stimulation attribute indicative of the voltage differences applied between selected pairs of the two or more electrodes (e.g., different stimulation vectors). In certain implementations in which the at least one stimulation element 114 is configured to stimulate the muscle and/or the neuron controlling the muscle (e.g., stimulation electrodes positioned on the genioglossus muscle and facing both branches of the hypoglossal nerve and configured to stimulate a portion of the hypoglossal nerve and proximal muscle fibers), the pulse shape of the stimulation signals 112 can be selectively configured for axon activation rather than muscle fiber activation, thereby providing broader stimulation throughout the muscle, more efficient stimulation, and lower muscle fatigue.

In certain implementations, the stimulation signals described by the stimulation signal profile are configured to prevent at least one SDB event (e.g., an OSA breathing stoppage) during the sleep session while preventing at least one disruption of the sleep session by the stimulation signals 112 (e.g., waking the recipient due to the physiological response evoked by the stimulation signals 112, whether perceived or not by the recipient). For example, the stimulation signal profile can be configured such that a first number of SDB events experienced by the recipient during a current sleep session with the stimulation signal profile is lower than a second number of SDB events experienced by the recipient during a previous sleep session with a different stimulation signal profile (e.g., the current and previous sleep sessions having the same duration and other conditions). In addition, the stimulation signal profile can be configured such that a third number of sleep disruptions during a current sleep session with the stimulation signal profile is lower than a fourth number of sleep disruptions during a previous sleep session with a different stimulation signal profile (e.g., the current and previous sleep sessions having the same duration and other conditions).

Figure 2A:
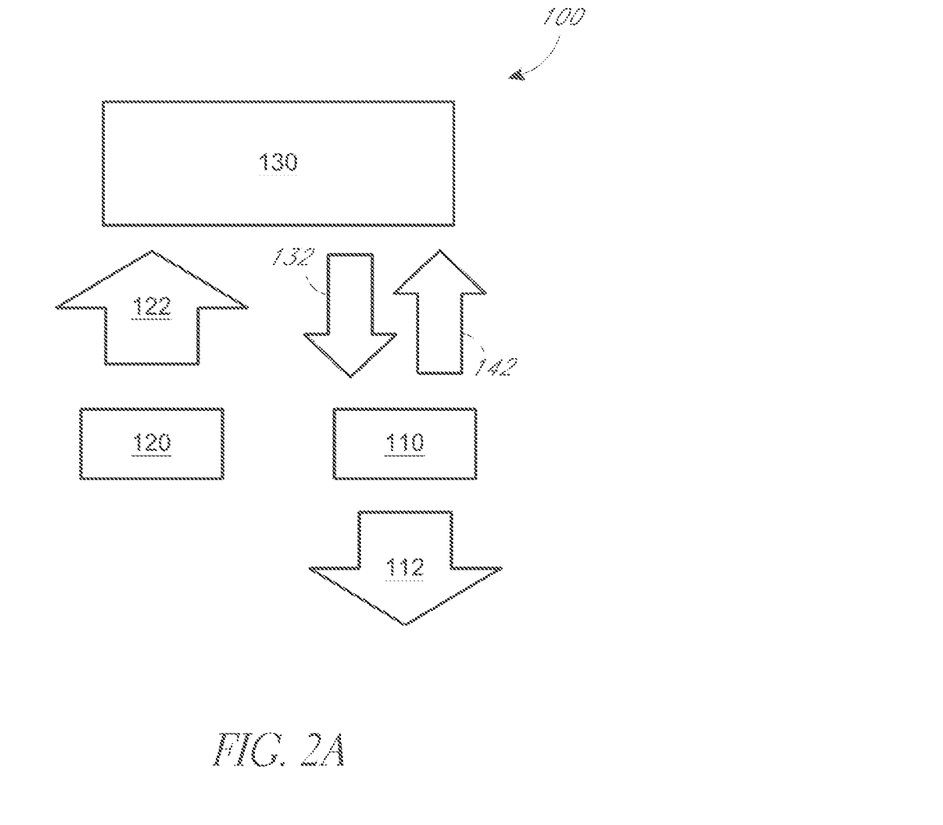
FIGS. 2A-2C schematically illustrate various example apparatus utilizing additional information in accordance with certain implementations described herein.
Figure 2B:
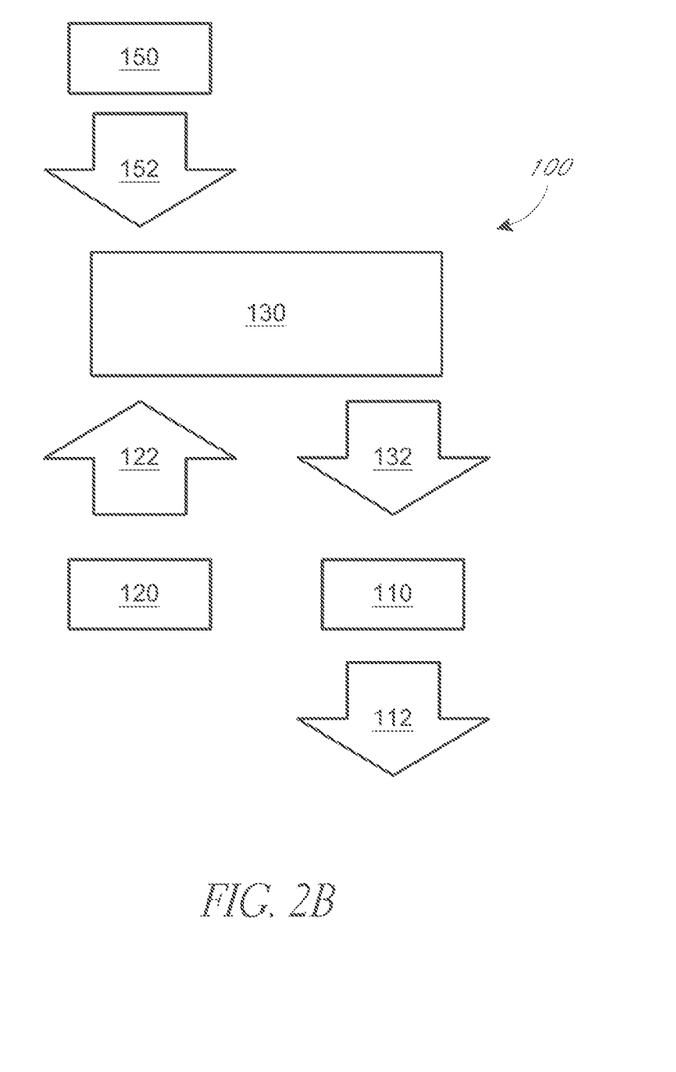
Figure 2C:
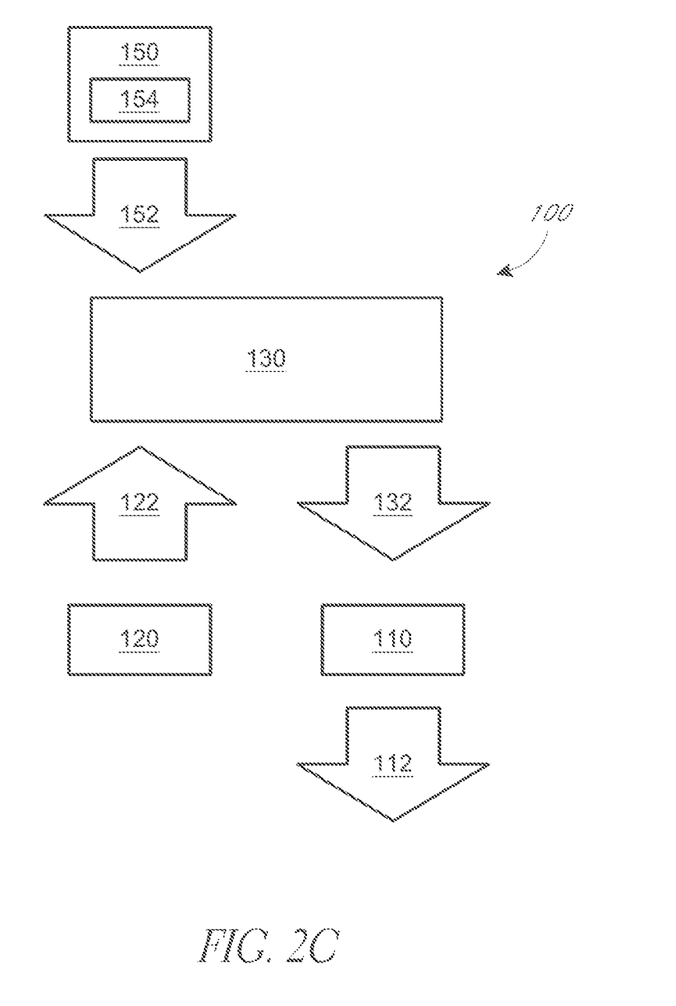

In certain implementations, the third circuitry 130 is configured to receive additional information, besides the muscle fatigue information from the sensor signals 122 generated by the second circuitry 120, and to, in response at least in part to the additional information, provide the control signals 132 to the first circuitry 110. FIGS. 2A-2C schematically illustrate various example apparatus 100 utilizing additional information in accordance with certain implementations described herein. In the example apparatus 100 of FIG. 2A, the first circuitry 110 is configured to provide status signals 142 indicative of a status of the first circuitry 110 (e.g., operational status of at least one component of the first circuitry 110; record of stimulation signals 112 actually provided). The third circuitry 130 is configured to extract and use the additional status information from the status signals 142 in generating the control signals 132.

FIGS. 2B-2C schematically illustrate example apparatus 100 utilizing additional objective information in accordance with certain implementations described herein. The example apparatus 100 of FIGS. 2B-2C comprise at least one device 150 configured to provide signals 152 indicative of the additional objective information to the third circuitry 130. In certain implementations, the at least one device 150 is configured to communicate the signals 152 wirelessly to the third circuitry 130, while in certain other implementations, the at least one device 150 is configured to communicate the signals 152 via at least one conduit (e.g., wire; cable) to the third circuitry 130. In certain implementations, the at least one device 150 is an integral component of the third circuitry 130, while in certain other implementations, the at least one device 150 is separate from the third circuitry 130.

The additional objective information can be indicative of at least one aspect of the sleep session. In certain implementations, the at least one device 150 comprises at least one sensor responsive to the recipient's physiology during the sleep session by generating the signals 152. Examples of such sensors include but are not limited to: a blood oximetry sensor configured to detect a blood oxygen level of the recipient during the sleep session; an electrooculogram (EOG) device configured to detect eye movement (e.g., electrical potentials indicative of eye movement) of the recipient during the sleep session; an electromyogram (EMG) device configured to detect muscle movement of the recipient during the sleep session (e.g., movement of one or more limbs); a cardiac monitoring device (e.g., pulse sensor; electrocardiogram) configured to detect cardiac activity (e.g., heart rate; aberrant electrical activity) of the recipient during the sleep session.

In certain implementations, the at least one device 150 comprises at least one sensor responsive to actions/responses by the recipient during the sleep session by generating the signals 152. Examples of such sensors include but are not limited to: at least one accelerometer (e.g., worn by the recipient) configured to detect movement of the recipient during the sleep session (e.g., limb/leg/arm/torso movement indicative of restlessness during sleep; respiratory chest movement indicative of inhalation); at least one microphone configured to detect sounds during the sleep session (e.g., recipient-generated sounds such as snoring, coughing, wheezing, labored breathing, talking during sleep, or other sounds indicative of apnea or hypopnea); at least one pressure sensor (e.g., on the recipient's bed) configured to detect movement of the recipient (e.g., tossing; turning) during the sleep session; at least one sensor configured to detect responses of the recipient's body evoked (e.g., proximal activity from neurons and/or muscles involved with respiration during sleep) by the stimulation signals 112. In certain implementations, recipient-generated sounds can be used to time the stimulation to the start of inhalation.

In certain implementations, in the example apparatus 100 schematically illustrated by FIG. 2C, the at least one device 150 comprises at least one non-transitory memory device 154 configured to store information to be provided to the third circuitry 130 and the third circuitry 130 is configured to access the stored information from the at least one non-transitory memory device 154. Examples of the at least one non-transitory memory device 154 can include but are not limited to: random-access memory (RAM) integrated circuit; flash memory; hard-disk drive; other tangible data storage device. In certain implementations, the at least one non-transitory memory device 154 is an integral component of the third circuitry 130, while in certain other implementations, the at least one non-transitory memory device 154 is a component of a smartphone, smart tablet, smart watch, electronic diary, or remote device operated by the recipient. In certain implementations, the at least one non-transitory memory device 154 is configured to be accessed by the third circuitry 130 via the internet (e.g., the at least one non-transitory memory device 154 is part of the cloud). The collation of the objective information in the cloud (e.g., including clinical outcomes of the recipient and/or other recipients) can further be used to optimize operation of the apparatus 100 for recipient characteristics and/or medical conditions (e.g., epilepsy; diabetes). In certain implementations, the at least one non-transitory memory device 154 is configured to store information obtained from the responses of at least one of the foregoing sensors disclosed herein (e.g., EMG sensors 124; sensors responsive to the recipient's physiology during the sleep session; sensors responsive to actions/responses by the recipient during the sleep session).

In certain implementations, the stored information is indicative of at least one past sleep session of the recipient. For example, the stored information can comprise information indicative of the sensor signals 122 generated by the second circuitry 120 during the at least one past sleep session and/or information indicative of the control signals 132 generated by the third circuitry 130 during the at least one past sleep session. Such stored information can be used by the third circuitry 130 to compare the efficacy of a stimulation therapy being applied during a current sleep session to at least one stimulation therapy applied during at least one past sleep session. In certain other implementations, the stored information is indicative of a past portion of the current sleep session (e.g., previous hour; previous 10 minutes to one hour; previous minute; previous sleep cycle). The stored information of certain implementations is indicative of at least one direct measurement of muscle fatigue.

In certain implementations, the stimulation signals 112 applied during the sleep session have at least one stimulation attribute (e.g., repetition rate; phase duration or burst duration; duty cycle; temporal amplitude profile; stimulation vector) that is modified (e.g., adjusted; titrated) during the sleep session. For example, the at least one stimulation attribute can be automatically modified (e.g., adjusted; titrated) in response to the detected muscle fatigue to arrive at an effective value that reduces (e.g., minimizes) the muscle fatigue while continuing to stimulate the at least one muscle and/or the at least one neuron. The reduction of the muscle fatigue can be effective to reduce (e.g., minimize) the number and/or severity of SDB events and/or sleep disruptions induced by the treatment. In this way, certain implementations can continue the treatment during the sleep session while avoiding a reduction in efficacy due to muscle fatigue. The third circuitry 130 of certain implementations is further configured to provide the stimulation signal profile of the sleep session to be stored (e.g., by the non-transitory memory device 174 of the at least one device 170) to be accessible by the third circuitry 130 during subsequent sleep sessions.

Figure 3:
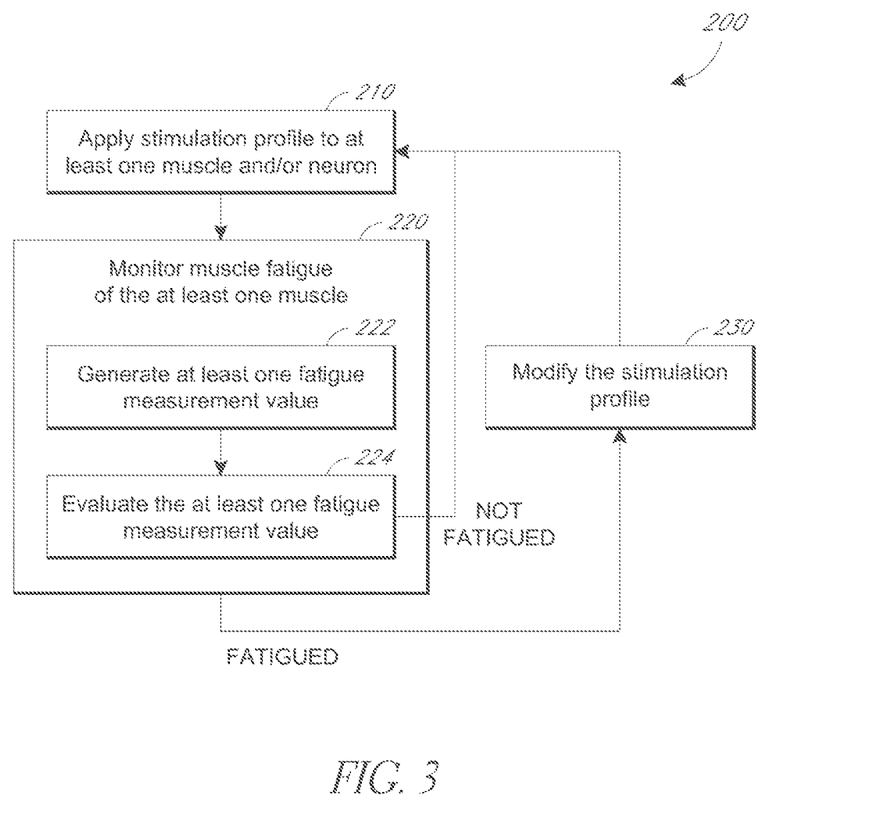
FIG. 3 is a flow diagram of an example method utilizing information regarding the detected muscle fatigue in accordance with certain implementations described herein.

FIG. 3 is a flow diagram of an example method 200 utilizing information regarding the detected muscle fatigue in accordance with certain implementations described herein. For example, the information regarding muscle fatigue can be obtained during a sleep session and the stimulation profile can be automatically modified in response to the detected muscle fatigue. In certain implementations, the method 200 is performed upon initiating a sleep session and can comprise obtaining information and/or instructions from the recipient (e.g., from a device used by the recipient to input and store the information and/or instructions) prior to the sleep session (e.g., instructions from the recipient for controlling aspects of the method 200 during the upcoming sleep session).

The method 200 of certain implementations can utilize closed loop control of the stimulation profile. In certain implementations, the method 200 is self-fitting such that on a first fitting, the stimulation signals start at a sub-clinical level and are gradually increased in stimulus level during subsequent sleep sessions until the therapeutic window is detected, and on-going treatment can further be adjusted to fine optimal settings in the treatment window for reduction of OSA events and/or improvement of sleep quality. In certain implementations, the method 200 is trainable such that historical data of optimal settings of the stimulation signals can be used to reduce (e.g., minimize) OSA events and/or increase (e.g., maximize) sleep quality.

In an operational block 210, the method 200 comprises applying a stimulation profile comprising a plurality of stimulation signals to at least one muscle of a recipient and/or to at least one neuron configured to control the at least one muscle. In an operational block 220, the method 200 further comprises monitoring muscle fatigue of the at least one muscle during said applying the stimulation profile. For example, the at least one muscle can comprise at least one tongue muscle, and said monitoring muscle fatigue and said applying the stimulation profile can be performed during a sleep session of the recipient (e.g., to treat obstructive sleep apnea). Examples of stimulation attributes that can be adjusted include but are not limited to: repetition rate of the stimulation signal pulses (e.g., number per unit time; frequency); phase duration or burst duration of the stimulation signal pulses; duty cycle of the stimulation signal pulses (e.g., stimulation "on time" versus the "off time" in cyclical bursts); temporal amplitude profile of the stimulation signals; a temporal ramping rate of a stimulation signal amplitude; onset voltage; offset voltage; amplitude of the stimulation signal pulses.

If the sleep session is the first sleep session of the recipient for which the method 200 is being utilized, the stimulation profile can be a default profile (e.g., accessed from at least one non-transitory memory device). Alternatively, the stimulation profile can be based, at least in part, on muscle fatigue measurements over previous time periods and changes to stimulus attributes in these previous time periods. If the sleep session is not the first sleep session of the recipient for which the method 200 is being utilized, the stimulation profile can be based, at least in part, on a stimulation profile applied to the recipient during a previous sleep session.

In certain implementations, monitoring muscle fatigue in the operational block 220 comprises obtaining the sensor signals 122 (e.g., during the sleep session), the sensor signals 122 indicative of the muscle fatigue of the recipient (e.g., from the at least one EMG sensor 124). In certain such implementations, the sensor signals 152 can include signals indicative of other objective information (e.g., signals 152 from at least one device 150 indicative of one or more of: the recipient's physiology during the sleep session, actions/responses by the recipient during the sleep session.

In certain implementations, monitoring muscle fatigue in the operational block 220 further comprises generating at least one fatigue measurement value indicative of the muscle fatigue of the at least one muscle in an operational block 222 and evaluating the at least one fatigue measurement value in an operational block 224. In certain implementations, generating the at least one fatigue measurement value in the operational block 222 is in response, at least in part, to the EMG signals from the at least one muscle. For example, the at least one fatigue measurement value can comprise a contraction frequency of the at least one muscle, the contraction frequency derived from the EMG signals. In certain embodiments, monitoring the muscle fatigue comprises periodic measurements of the muscle fatigue during said applying of the stimulation profile (e.g., performed at regular time intervals during the sleep session; every 10 minutes; every 5 minutes; very minute; every 30 seconds).

In certain implementations, monitoring muscle fatigue (e.g., tongue fatigue) comprises measuring muscle fiber conduction velocity (MFCV) (e.g., using a signal acquisition and processing module of the third circuitry 130). See, e.g., E. Koutsos et al., "A Muscle Fibre Conduction Velocity Tracking ASIC for Local Fatigue Monitoring," IEEE Trans. Biomed. Circuits and Systems, Vol. 10, No. 6, pp. 1119-1128 (2016); D. McSharry et al., "Genioglossus fatigue in obstructive sleep apnea," Resp. Phys. & Neurobio. Vol. 183, pp. 59-66 (2012). Such measurements can comprise collecting at least two signals at different electrode locations along the muscle (e.g., using an instrumentation amplifier or biopotential amplifier which has a high common mode rejection). In certain implementations, signal amplification and/or analog filtering can be applied to the collected signals. For example, the at least two signals can be digitized (e.g., sampled by an analog-to-digital converter) with sampling used to capture a frame (e.g., between 10 milliseconds and 100 milliseconds after an electrical stimulation; directly after electrical stimulation when an artifact is gone; free running; in response to natural tongue movement). In certain implementations, signal filtering can be applied. For example, high-pass filtering can be applied to pass signals above 20 Hz to remove motion artifacts, or notch filtering can be applied (e.g., at 50 Hz or 60 Hz, depending on the main power supply frequency) to remove noise from the main power supply. In certain implementations, cross correlation of the signal can be performed to determine a signal delay (e.g., phase difference). For example, the captured signal frame from two electrodes can be cross correlated, the peak of the cross correlation signal can be determined, with the peak being representative of the time the signal took to travel along the muscle between the two electrodes. The MFCV can be calculated by dividing the known distance between the two electrodes by the time delay found from the cross-correlation peaks.

In certain implementations, evaluating the at least one fatigue measurement value in the operational block 224 comprises accessing at least one threshold value indicative of an undesired level of muscle fatigue being experienced by the recipient and said evaluating further comprises comparing the at least one fatigue measurement value to the at least one threshold value. For example, the at least one threshold value can comprise a threshold value that had been previously stored (e.g., in at least one non-transitory memory device) and/or a threshold value that is generated in real time based on one or more previously-received EMG signals from the recipient (e.g., indicative of a changing level of muscle fatigue during the sleep session) and/or based on input from the recipient indicative of a selected modification of the threshold value to generate an individualized threshold level.

In certain implementations, the MFCV measurement value can be compared to previous such MFCV measurement values to evaluate the muscle fatigue. A baseline MFCV value can be calculated (e.g., in a clinic by a clinician; after surgery; at the time of fitting the apparatus 100) and a relative muscle fatigue measurement value can be tracked over a period of time (e.g., overnight). For example, a MFCV measurement value obtained when muscle fatigue is expected to be low (e.g., at the start of the period of time; at the start of the night) can be considered to be indicative of low muscle fatigue. A baseline or relative MFCV measurement values (e.g., in conjunction with other information, such as experience, previous night's measurements; laboratory measurements) can then be compared to the rising MFCV measurement values obtained during the period of time to determine the level of muscle fatigue.

If the comparison does not indicate that an undesired level of muscle fatigue is being experienced by the recipient (e.g., as indicated in FIG. 3 by the line labeled "Not Fatigued"), then the stimulation profile continues to be applied without modification in the operational block 210. If the comparison indicates that the undesired level of muscle fatigue is being experienced by the recipient (e.g., as indicated in FIG. 3 by the line labeled "Fatigued"), then the stimulation profile is modified in an operational block 230 and the modified stimulation profile is applied in the operational block 210. In certain implementations, the modified stimulation profile can be stored (e.g., in at least one non-transitory memory device) to be accessed prior to and/or during a subsequent sleep session.

Examples of stimulation attribute changes (e.g., adjustments) include but are not limited to one or more of: changing the electrodes used for stimulation and/or for return; increasing or decreasing (e.g., randomizing) an amplitude of the stimulation pulses in a stimulation burst and/or an amplitude between stimulation bursts (e.g., which can change a level of activation of the muscle bundle); increasing or decreasing a stimulation pulse width (e.g., which can change the nerves of fibers that are being activated); increasing or decreasing a pulse rate in a stimulation burst (e.g., jittering an inter-pulse interval, which can provide different recovery periods of the nerves and/or fibers); increasing or decreasing a phase between the stimulating electrode and return electrode (e.g., which can activate different nerve fibers); increasing or decreasing an interphase interval (e.g., biphasic pulses); increasing or decreasing the repetition rate of the stimulation signal pulses (e.g., number per unit time; frequency); increasing or decreasing the phase or burst duration of the stimulation signal pulses (e.g., a time period during which a sequence of stimulation signals pulses is applied); increasing or decreasing the duty cycle of the stimulation signal pulses; modifying the stimulation vector; modifying the temporal amplitude profile of the stimulation signals (e.g., increasing or decreasing pulse width, interphase gap duration of the stimulation signal pulses, and/or pulse amplitude as a function of time; changing the temporal shapes of the individual stimulation signal pulses and/or the temporal shape of an envelope of stimulation signal pulses during a burst of the stimulation signal pulses); increasing or decreasing the temporal ramping rate of a stimulation signal amplitude (e.g., increasing or decreasing a slope of the leading edge of the stimulation signal pulses); increasing or decreasing onset voltage, offset voltage, and/or amplitude of the stimulation signal pulses. For example, the stimulation pulse width can be increased while the stimulation signal amplitude can be reduced so as not to have too large a response (e.g., to cause excessive discomfort and/or pain).

In certain implementations, a change of one or more stimulation attributes is made when a predetermined muscle fatigue level is reached. In certain implementations, the changes of one or more stimulation attributes are made continually or with randomized timing (e.g., changes that do not have large responses would not be expected to change the overall muscle response or pain threshold). In certain implementations, the muscle fatigue level in response to a stimulus change is recorded to determine which stimulus types, or stimulus changes are best at reducing muscle fatigue. The process can then be updated to make more efficient changes in the future.

In certain implementations, the changes can be made in gradual incremental steps (e.g., have minimal risk of causing an adverse event in the recipient). In certain implementations, the stimulation attribute to be changed and/or the amount of change can be in response to (e.g., based on) the detected amount of muscle fatigue, while in certain other implementations, the stimulation attribute to be adjusted and/or the amount of adjustment can be independent of the detected amount of muscle fatigue (e.g., selected randomly). The changes of certain implementations can be made to give some muscle fibers a rest from stimulation at periodic intervals (e.g., every few cycles).

In certain implementations, automatically modifying the stimulation profile comprises triggering a series of changes of the at least one stimulation attribute in response to said muscle fatigue, the changes sequential to one another by a predetermined time period (e.g., 10 minutes; 5 minutes; one minute; 30 seconds). In certain implementations in which monitoring the muscle fatigue comprises periodic muscle fatigue measurements while the stimulation profile is being applied, automatically modifying the stimulation profile comprises determining whether sequential muscle fatigue measurements are reduced and triggering different changes of the at least one stimulation attribute if the sequential measurements of the muscle fatigue are not reduced (e.g., if one change of one stimulation attribute does not result in a reduction of muscle fatigue, make a different change of the one stimulation attribute and/or make a change to a different stimulation attribute).

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, although the disclosed methods and apparatuses have largely been described in the context of conventional cochlear implants, various implementations described herein can be incorporated in a variety of other suitable devices, methods, and contexts. More generally, as can be appreciated, certain implementations described herein can be used in a variety of implantable medical device contexts that can benefit from having at least a portion of the received power available for use by the implanted device during time periods in which the at least one power storage device of the implanted device unable to provide electrical power for operation of the implantable medical device.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

The invention described and claimed herein is not to be limited in scope by the specific example implementations herein disclosed, since these implementations are intended as illustrations, and not limitations, of several aspects of the invention. Any equivalent implementations are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example implementations disclosed herein, but should be defined only in accordance with the claims and their equivalents.

What is claimed is:

1. A method comprising:
applying a stimulation profile comprising a plurality of stimulation signals to at least one muscle of a recipient and/or to at least one neuron configured to control the at least one muscle;
monitoring muscle fatigue of the at least one muscle during said applying the stimulation profile; and
automatically modifying the stimulation profile in response to said muscle fatigue, wherein said automatically modifying the stimulation profile comprises changing at least one stimulation attribute of the stimulation profile, the at least one stimulation attribute is selected from a group consisting of: a repetition rate of the stimulation signals, a phase duration of the stimulation signals, a burst duration of the stimulation signals, a duty cycle of the stimulation signals, a temporal amplitude profile of the stimulation signals, and a stimulation vector of the stimulation signals.

2. The method of claim 1, wherein the at least one muscle comprises at least one tongue muscle, said monitoring muscle fatigue and said applying the stimulation profile performed during a sleep session of the recipient to treat obstructive sleep apnea.

3. The method of claim 1, wherein said monitoring muscle fatigue comprises:
generating at least one fatigue measurement value indicative of the muscle fatigue of the at least one muscle; and
evaluating the at least one fatigue measurement value.

4. The method of claim 3, wherein said monitoring muscle fatigue comprises detecting electromyograph (EMG) signals from the at least one muscle and said generating the at least one fatigue measurement value is in response, at least in part, to the EMG signals.

5. The method of claim 4, wherein the at least one fatigue measurement value comprises a contraction frequency of the at least one muscle, the contraction frequency derived from the EMG signals.

6. The method of claim 3, wherein said evaluating comprises accessing at least one previously-stored threshold value indicative of an undesired level of muscle fatigue being experienced by the recipient and said evaluating comprises comparing the at least one fatigue measurement value to the at least one previously-stored threshold value.

7. The method of claim 1, wherein an amount of change of the at least one stimulation attribute is in response to the muscle fatigue.

8. The method of claim 1, wherein said automatically modifying the stimulation profile comprises triggering a series of changes of the at least one stimulation attribute in response to said muscle fatigue, the changes sequential to one another by a predetermined time period.

9. The method of claim 1, wherein monitoring said muscle fatigue comprises periodic measurements of the muscle fatigue during said applying, and said automatically modifying the stimulation profile comprises determining whether sequential measurements of the muscle fatigue are reduced and triggering different changes of the at least one stimulation attribute if the sequential measurements of the muscle fatigue are not reduced.

10. An apparatus comprising:
first circuitry configured to be implanted on or within a recipient's body, the first circuitry configured to apply stimulation signals to at least one muscle of a recipient and/or to at least one neuron configured to control the at least one muscle, the first circuitry comprising at least one electrode configured to be implanted on or within the recipient's body and to apply the stimulation signals to a portion of the tongue of the recipient and/or to a portion of a hypoglossal nerve of the recipient during a sleep session of the recipient;
second circuitry configured to generate information indicative of muscle fatigue of the at least one muscle, the second circuitry comprising the at least one electrode of the first circuitry; and
third circuitry configured to, in response at least in part to the information indicative of the muscle fatigue, provide control signals to the first circuitry, the control signals indicative of a stimulation signal profile configured to reduce the muscle fatigue of the at least one muscle.

11. The apparatus of claim 10, wherein the second circuitry is configured to generate electromyograph (EMG) signals indicative of the muscle fatigue.

12. The apparatus of claim 10, wherein the stimulation signal profile comprises at least one of: a repetition rate of the stimulation signals, a phase duration of the stimulation signals, a burst duration of the stimulation signals, a duty cycle of the stimulation signals, a temporal amplitude profile of the stimulation signals, and a stimulation vector of the stimulation signals.

13. An apparatus comprising:
first circuitry configured to be implanted on or within a recipient's body, the first circuitry configured to apply stimulation signals to at least one muscle of a recipient and/or to at least one neuron configured to control the at least one muscle;

second circuitry configured to generate information indicative of muscle fatigue of the at least one muscle; and third circuitry configured to, in response at least in part to the information indicative of the muscle fatigue, provide control signals to the first circuitry, the control signals indicative of a stimulation signal profile configured to reduce the muscle fatigue of the at least one muscle, wherein the third circuitry comprises a processor circuit configured to receive the information from the second circuitry and to receive information indicative of at least one aspect of the sleep session from at least one device configured to monitor the at least one aspect of the sleep session.

14. The apparatus of claim 13, wherein the at least one device comprises at least one of: an electrooculogram (EOG) device configured to detect eye movement of the recipient during the sleep session, an electromyogram (EMG) device configured to detect muscle movement of the recipient during the sleep session, a cardiac monitoring device configured to detect cardiac activity of the recipient during the sleep session, at least one accelerometer and/or at least one pressure sensor configured to detect movement of the recipient during the sleep session, at least one microphone configured to detect sounds generated by the recipient during the sleep session, at least one blood oxygenation sensor configured to detect a blood oxidation level of the recipient during the sleep session, at least one sensor configured to detect responses of the recipient's body evoked by the stimulation signals.

15. An apparatus comprising:

first circuitry configured to be implanted on or within a recipient's body, the first circuitry configured to apply stimulation signals to at least one muscle of a recipient and/or to at least one neuron configured to control the at least one muscle;

second circuitry configured to generate information indicative of muscle fatigue of the at least one muscle; and third circuitry configured to, in response at least in part to the information indicative of the muscle fatigue, provide control signals to the first circuitry, the control signals indicative of a stimulation signal profile configured to reduce the muscle fatigue of the at least one muscle, wherein the third circuitry is configured to communicate the stimulation signal profile to at least one tangible computer memory.

16. The apparatus of claim 15, wherein the at least one tangible computer memory is a component of a smartphone, smart tablet, smartwatch, electronic diary, or remote device operated by the recipient.

17. A non-transitory computer readable storage medium having stored thereon a computer program that instructs a computer system to automatically adjust stimulation signals configured to affect at least one muscle of a recipient, the computer program instructing the computer system to:

apply first stimulation signals to the at least one muscle and/or to at least one nerve configured to control the at least one muscle, the first stimulation signals having a first set of attributes;

detect fatigue of the at least one muscle in response to the first stimulation signals; and in response to said detected fatigue, apply second stimulation signals to the at least one muscle and/or to the at least one nerve, the second stimulation signals having a second set of attributes different from the first set of attributes, wherein the first set of attributes comprises a first attribute selected from a group consisting of: a first repetition rate of the first stimulation signals, a first phase duration of the first stimulation signals, a first burst duration of the first stimulation signals, a first duty cycle of the first stimulation signals, a first temporal amplitude profile of the first stimulation signals, and a first stimulation vector of the first stimulation signals and the second set of attributes comprises a second attribute selected from a group consisting of: a second repetition rate of the second stimulation signals, a second phase duration of the second stimulation signals, a second burst duration of the second stimulation signals, a second duty cycle of the second stimulation signals, a second temporal amplitude profile of the second stimulation signals, and a second stimulation vector of the second stimulation signals.

18. The non-transitory computer readable storage medium of claim 17, comprising a component of a smartphone, smart tablet, smartwatch, electronic diary, or remote device operated by the recipient.

19. The non-transitory computer readable storage medium of claim 17, wherein the at least one muscle comprises at least one tongue muscle, and the fatigue is detected and the second stimulation signals are applied during a sleep session of the recipient to treat obstructive sleep apnea.

20. The non-transitory computer readable storage medium of claim 17, wherein the fatigue is detected using electromyograph (EMG) signals from the at least one muscle.

* * * * *